June 13, 1933. H. E. SMITH ET AL 1,913,517
LIGHT PROJECTION
Original Filed April 24, 1929 8 Sheets-Sheet 1
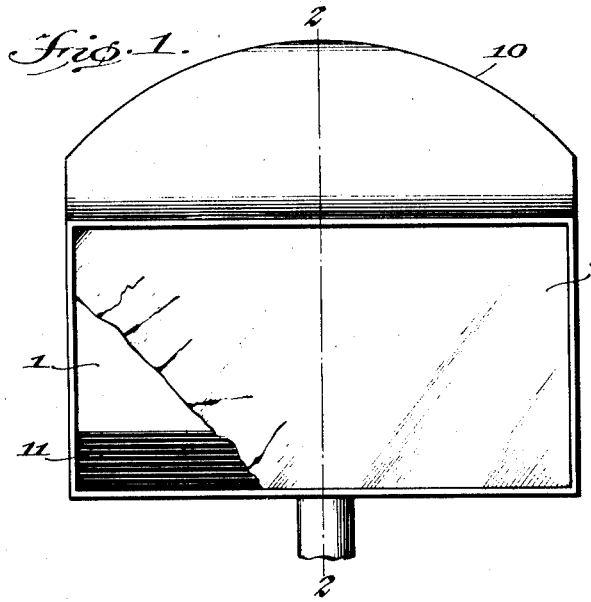
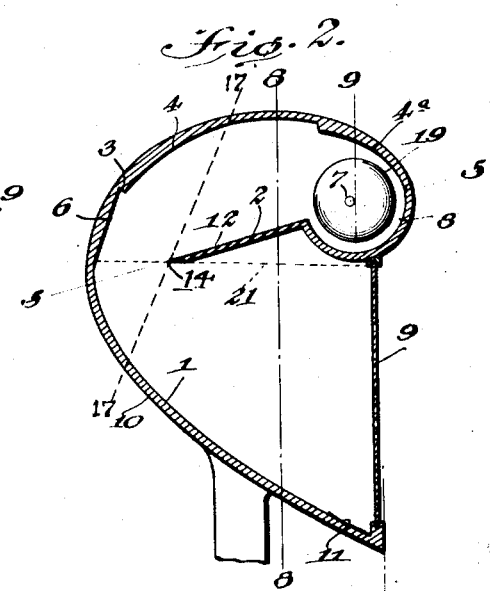
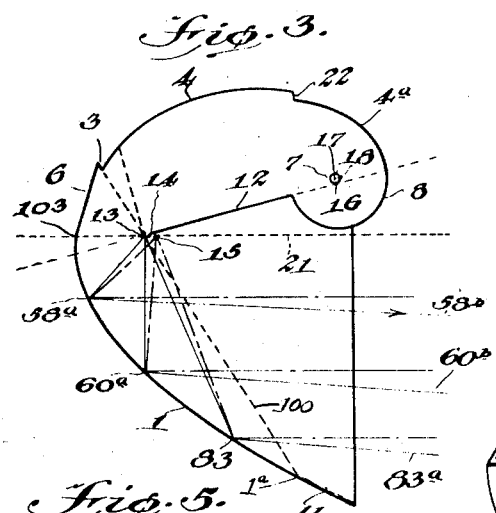
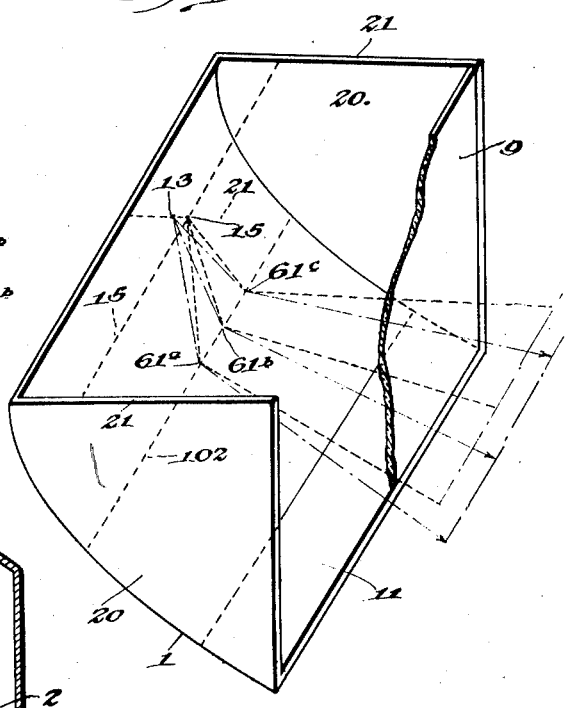
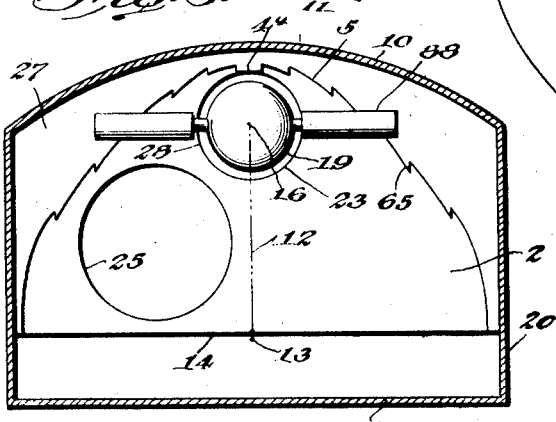
INVENTORS
H.E. Smith
H.E. Buffington
BY
ATTORNEY

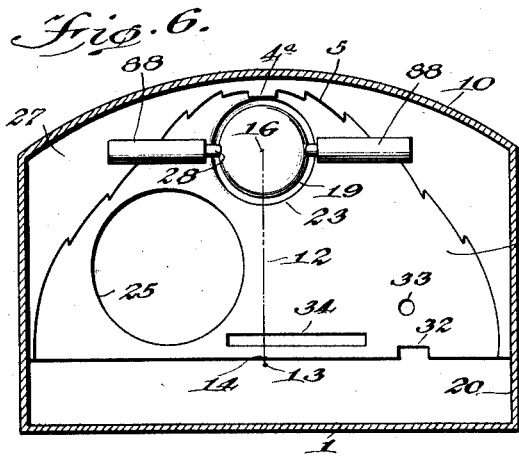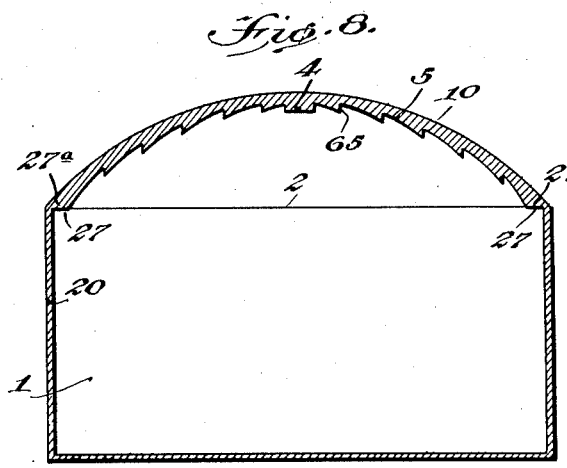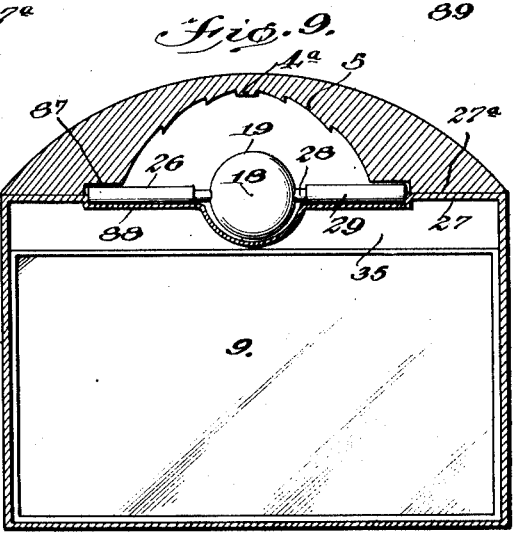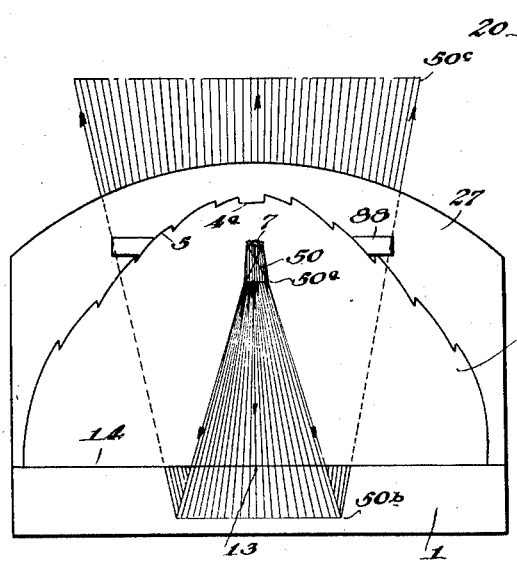

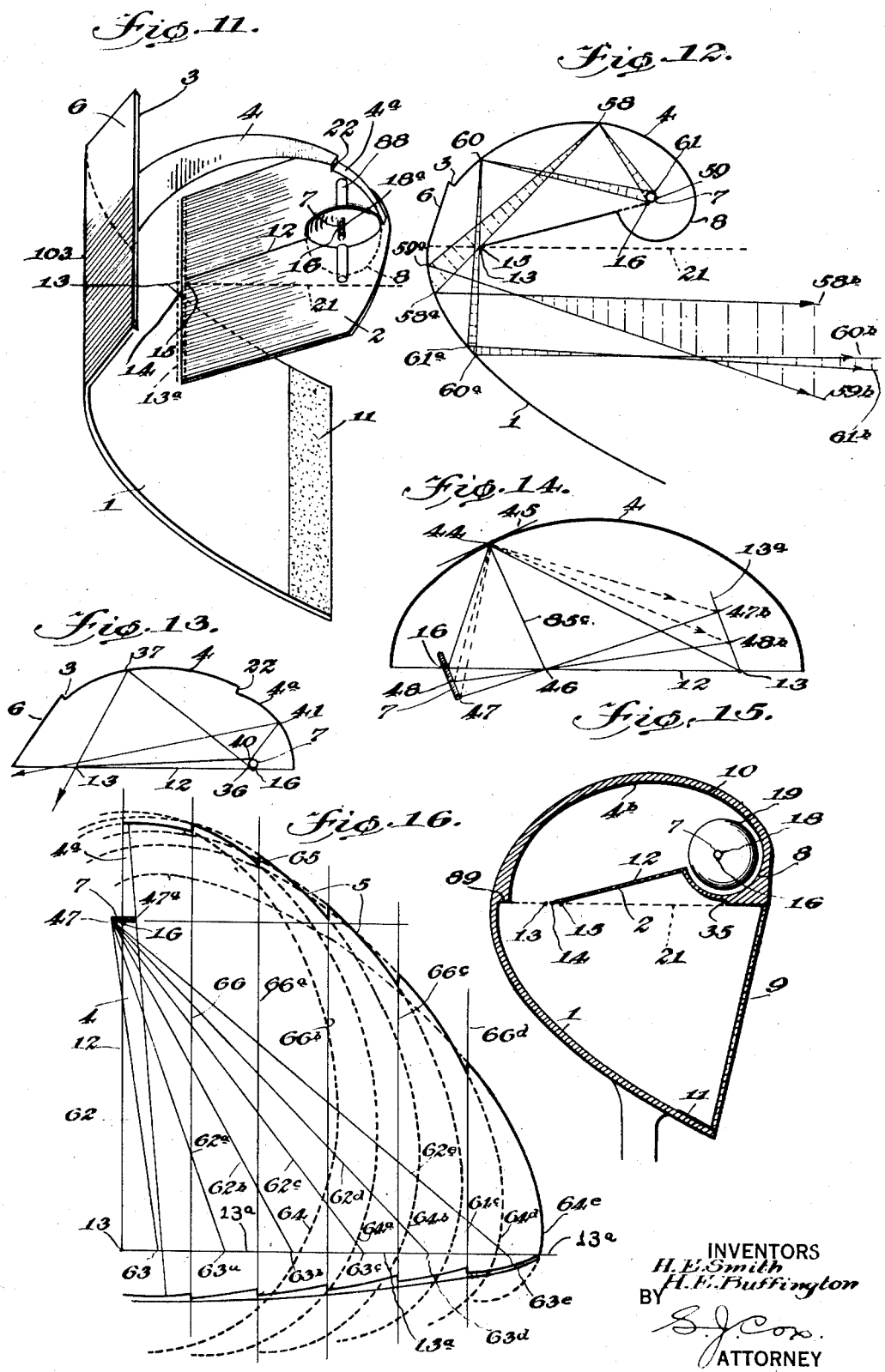

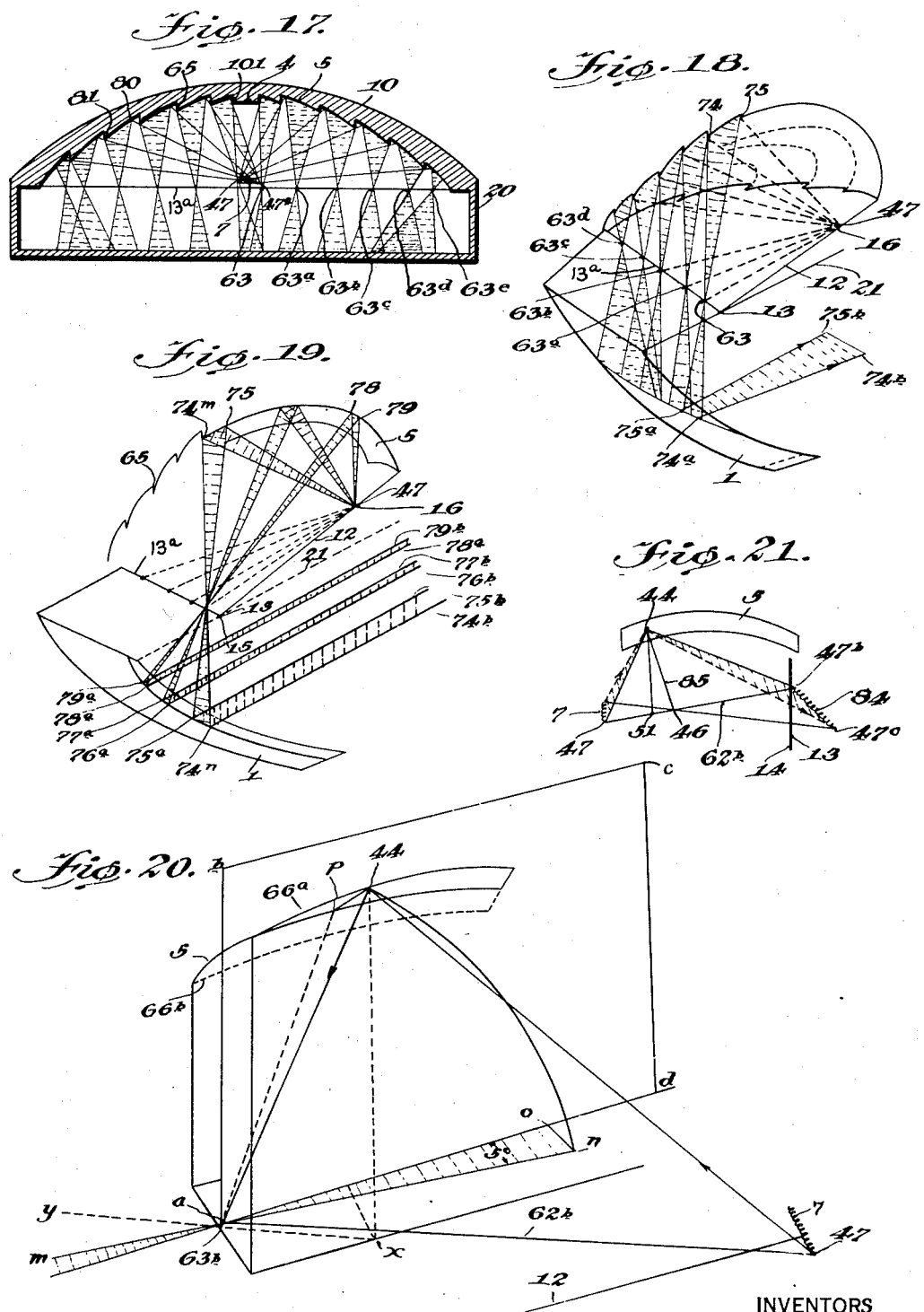

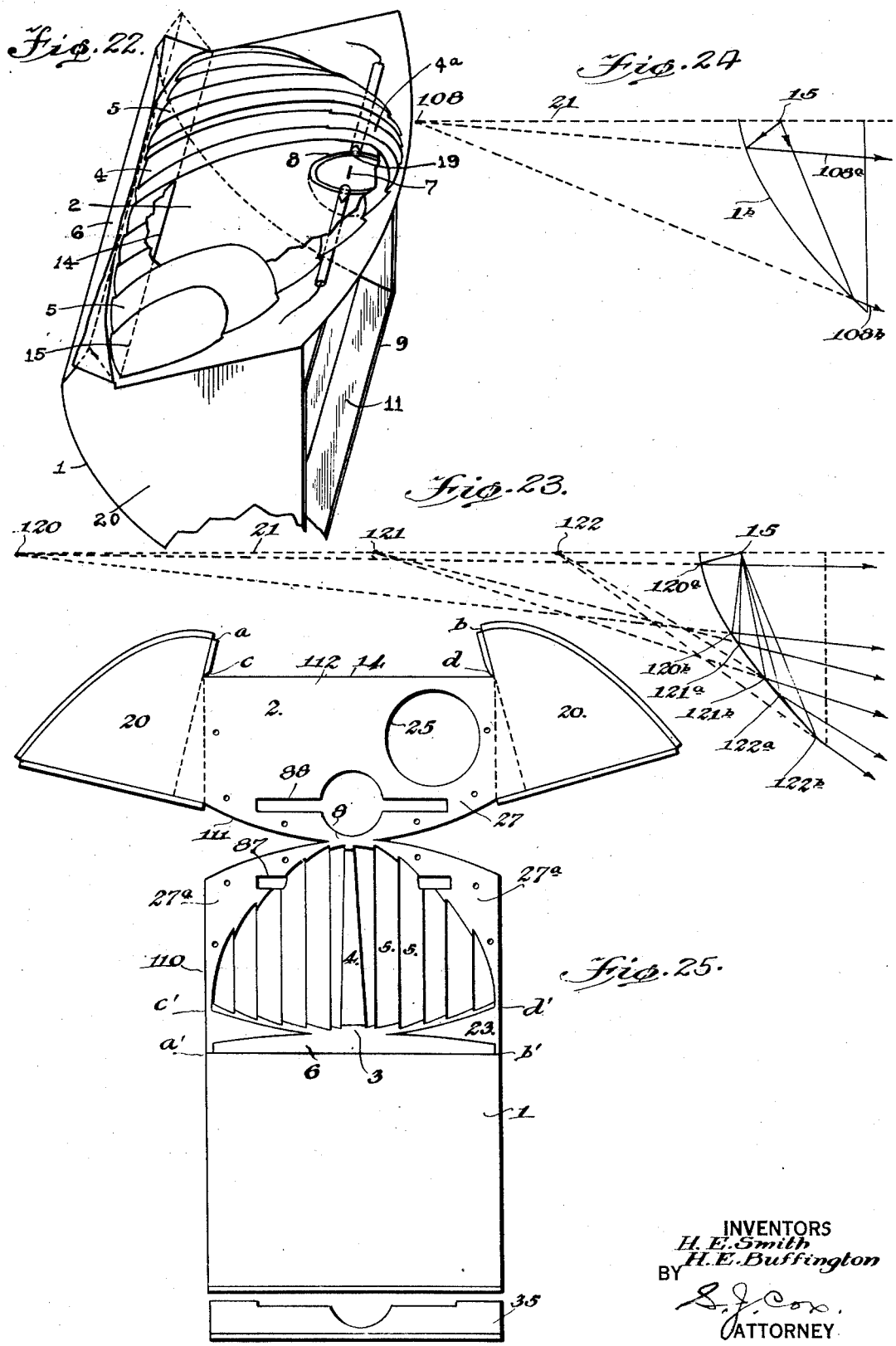

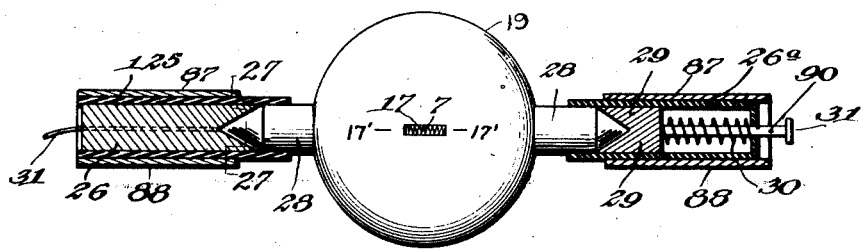
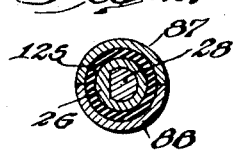
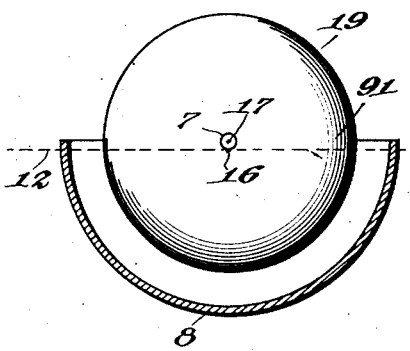
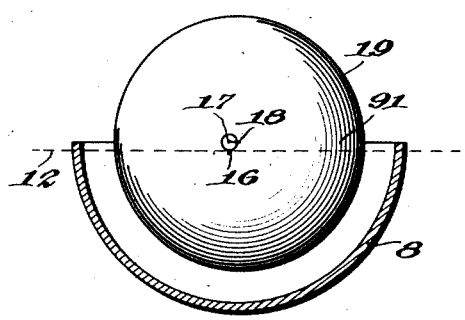
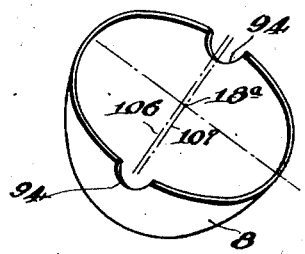

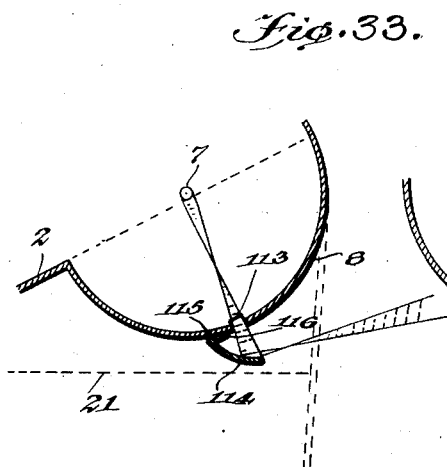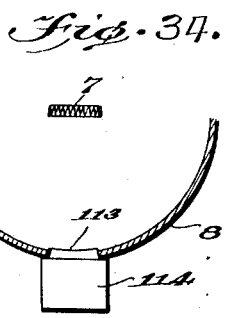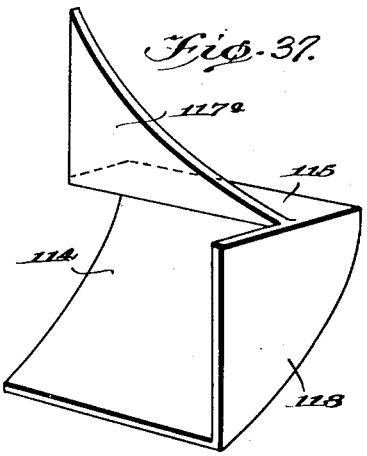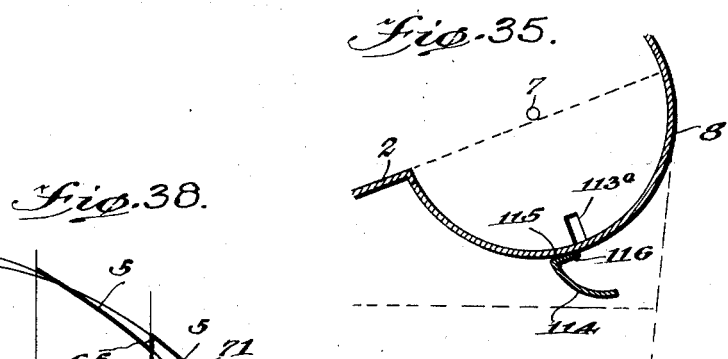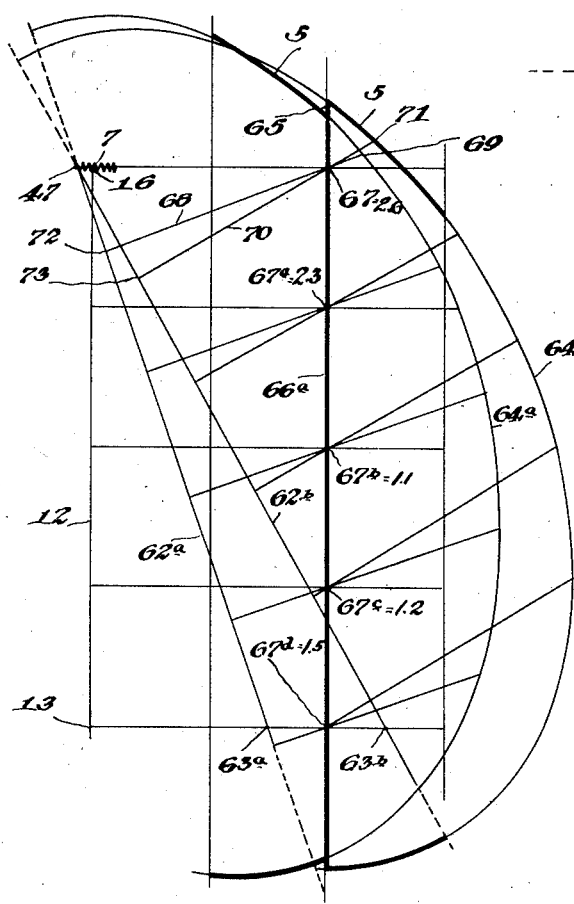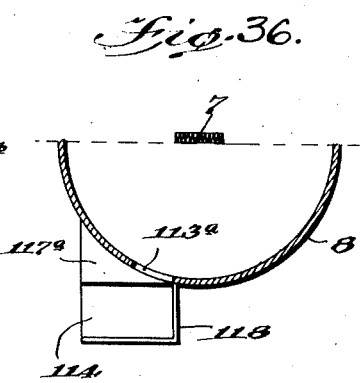

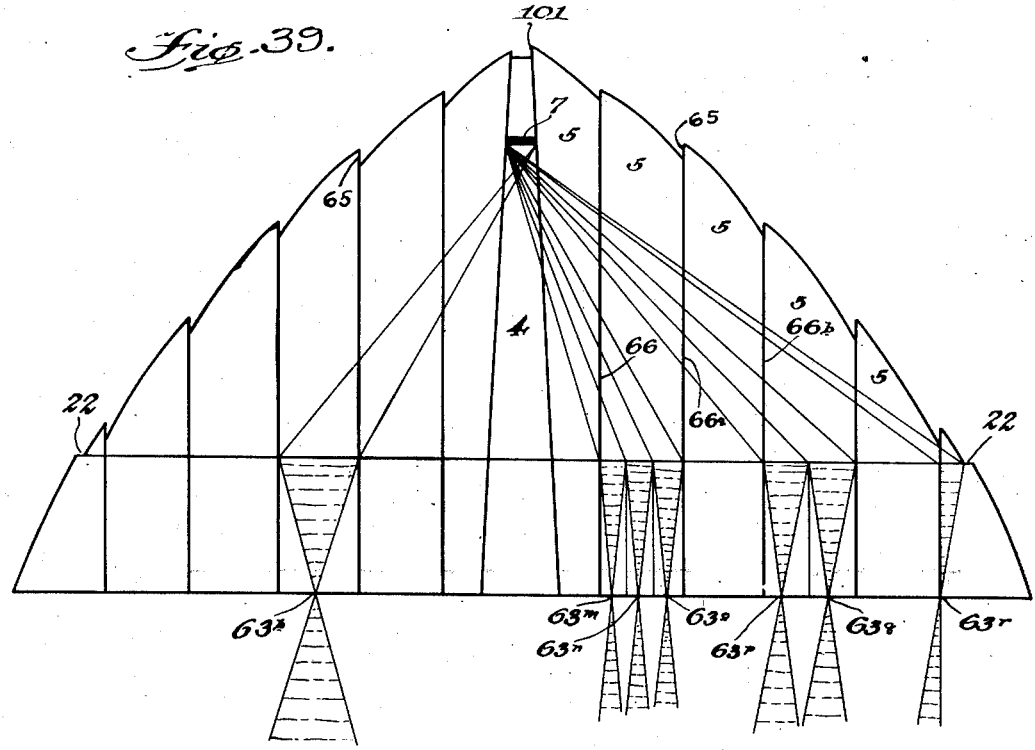
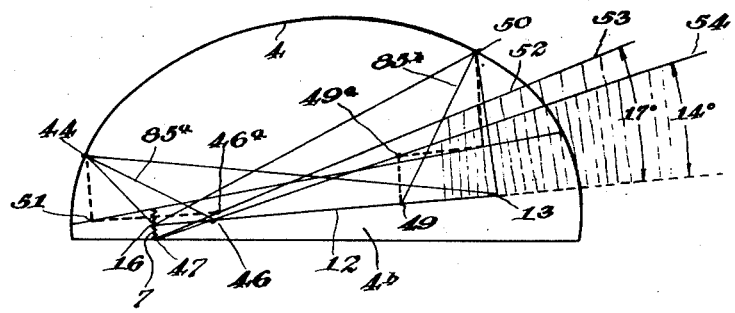

Patented June 13, 1933

1,913,517

UNITED STATES PATENT OFFICE

HAROLD E. SMITH AND HARRY E. BUFFINGTON, OF LYKENS, PENNSYLVANIA

LIGHT PROJECTION

Application filed April 24, 1929, Serial No. 357,670. Renewed October 21, 1931.

The present improvements relate, in general, to light distribution and are more particularly concerned with the scientific and practical control and distribution of light reflected from a radiant source for illuminating purposes, and are based on co-ordinated principles and functions of optical media providing selectively predetermined control and distribution for use wherever control of light rays is desired in a predetermined requirement either of direction or intensity or both and are particularly useful when applied to head lights on automobiles and other moving vehicles, and will be exemplified in their application to such head lights.

A primary object, among others, of the present improvements is to provide a light projecting device which prevents glare and at the same time does not sacrifice or impair the efficiency of the illumination.

Another object is to provide an illuminating device having a novel arrangement of reflecting surfaces in combination with a light source. A further object is to provide a device of the aforementioned character wherein the intensity, direction, spread, etc. of the rays may be predetermined and controlled.

A still further object is to provide an improved shield or baffle in combination with selected reflectors interrelated thereto, for compelling the projection of rays from a light source in a prescribed manner.

Other objects include the provision of a novel type of light source, improved auxiliary reflectors, as well as other improved details of construction and arrangement of parts whereby the efficiency of devices in the selected field are increased in general.

The improvements, when applied to this field of use, act to prevent the accidents to users of the highway at night caused by the blinding glare from conventional headlights and will illumine the roadway in such a manner as is found to be most useful for the safety and comfort of the driver of vehicles and other users of the highway and as is required by law in many States.

We accomplish these results by means of a novel method of control expressed through media including four major parts or elements co-related to and in combination with each other and which consists of:

(1) A light source in the region of one of the foci of a deflector.

(2) A deflector consisting of one or more reflecting surfaces having the optical properties respectively of an ellipse, a sphere, and a flat surface.

(3) A non-reflecting light absorbent baffle plate terminating in the region of the other of the foci of the deflector and interposed between the deflector, light source and, (4) A concaved cylindrical reflecting surface formed by sliding a suitable conic section, as a parabola or hyperbola, along a straight line as a directrix.

These elements will be shown in their various forms and relative positions of co-operation and their forms and the manner in which we combine them to perform the functions which produce predetermined results are disclosed in detail in the following specification and in their preferred and modified forms and arrangements are illustrated in the accompanying drawings forming part hereof, in which:

Figure 1 is a front view of a headlight embodying our invention with part of front glass cover broken away.

Figure 2 is a vertical section on line 2—2 of Figure 1, through the central primary axis of the deflector.

Figure 3 is a diagrammatic view of the same section as Figure 2, showing the positions of the foci, centers, and the cutting edge of the baffle plate, as correlatedly locused, and the projection by the cylindrical reflector of impinging rays showing the downward divergence below a horizontal.

Figure 4 is a diagrammatic perspective view of the parabolic cylindrical reflector including part of the front glass cover, and showing the line of foci, the light absorbent sides, the light absorbent strip at the reflector's bottom, with lines indicating the lateral spread of rays diverging from a common point impinging on the same straight line and projected in the same plane.

Figure 5 is a transverse sectional view on line 5—5 of Figure 2, showing the baffle plate in a plane containing its upper surface, with light globe and socket holders in place.

Figure 6 is a view similar to Figure 5, but with the baffle plate modified to provide special purpose apertures.

Figure 7 is an inverted plan view of the segmental deflector with a flat horizontal non-reflective extension surface as a connecting member between the deflector and reflector as shown in Figure 15.

Figure 8 is a transverse vertical section taken on line 8—8 of Figure 2, showing the transverse contour of the sides of the elliptical segmental deflector and of its central cylindrical portion.

Figure 9 is a vertical transverse section taken on line 9—9 of Figure 2, through the center of the light globe and the underlying hemi-spherical reflector, showing the deflector contour, the relative positions of the globe and the hemi-spherical reflector, and the front glass cover, and a vertically disposed connecting plate underlying the baffle plate and hemi-spherical reflector.

Figure 10 is a diagrammatic view of the path of the rays from the light source showing the width spread as deflected by the central cylindrical elliptical reflector and reflected by the parabolic cylindrical reflector.

Figure 11 is a diagrammatic perspective view of the correlated positions of the central elliptical cylindrical portion of the deflector and other primary elements with the segmental sides of the deflector surface omitted.

Figure 12 is a diagrammatic illustration of the paths of the rays deflected by the central elliptical cylinder showing their vertical spread beneath a horizontal as effected by the diameter of the light source and the point of impingement.

Figure 13 is a diagrammatic view showing the change of foci in the construction of the generating line forming the central cylindrical section of the elliptical deflector, the flat reflective member, and the plural axes.

Figure 14 is a diagrammatic illustration of the optical property of the elliptical cylinder section of the deflector in its relation to the light source showing that all rays originating in a line perpendicular to the axis at one focus in a horizontal plane containing the axis and impinging on a common point are projected to a line perpendicular to the axis at the other focus in the same plane.

Figure 15 is a vertical section on line 2—2 of Figure 1, showing a modified construction of the central elliptical cylinder with a horizontal non-reflective connecting member, and an inclined front glass cover.

Figure 16 is a diagrammatic illustration showing the segmental ellipsoidal sides of the deflector and method of constructing the generating line for each side segment, with rear ends of segments terminating at the inclined flat reflective member connecting the deflector and reflector and with the central elliptical cylindrical portion in place.

Figure 17 is a diagrammatic illustration of the width spread of the focal rays segregated into groups by the segmental deflector, as taken by transverse section on line 17—17 of Figure 2 with the light source shown in prospect.

Figure 18 is a diagrammatic perspective illustration of the horizontal spread of the focal rays of the segregated groups, the connector and part of the deflector being removed.

Figure 19 is a diagrammatic perspective illustration of the vertical spread of the focal rays of one of the segments of the segregated groups illustrated in Fig. 18, the connector and part of the deflector being removed.

Figure 20 is a diagrammatic view illustrating the measurement of the width spread of rays impinging a side segment emitted as focal and also for the most distant from the focus.

Figure 21 is a diagrammatic view of a side elliptical segment of the deflector impinged by rays most distant from the focus, showing the passage of the whole image of the light source beyond the baffle plate.

Figure 22 is a perspective view of an assembled headlight embodying one form of the present improvements, parts being broken away.

Figure 23 is a diagrammatic view of a compound hyperbolic cylindrical reflector which may be used.

Figure 24 is a diagrammatic view of a hyperbolic cylindrical reflector which may be similarly used in substitution for the parabolic reflector.

Figure 25 is a plan view of a die-stamped metal blank from which the light projecting device may be fabricated.

Figure 26 is a sectional view through the globe, ferrules and sockets as made by a vertical plane containing the axis of the filament and sockets.

Figure 27 is a cross section on line 27—27 of Figure 26 showing the conical end of the ferrule with the flat face positioned in the fixed insulated receiving socket.

Figure 28 is a perspective view of the conical end of a ferrule showing its flat pyramidal side face.

Figure 29 is a perspective view showing a socket member with flat pyramidal side in its hollow cone.

Figure 30 is a vertical section through the hemispherical reflector and globe on the central primary axis with the centers of globe and reflector and the axis of the helix coinciding.

Figure 31 is a vertical section through the hemi-spherical reflector and globe on the central primary axis with centers coinciding but offset from the axis of the helix.

Figure 32 is a perspective view of the hemispherical reflector, showing recesses for socket members.

Figure 33 is a vertical section of a modified form of hemispherical reflector showing a slot cut in the bottom thereof with a miniature parabolic reflector therebelow, an interposed light trimming edge and an increased angle of divergence, between the main baffle plate and the axis of the main cylindrical reflector, the vertical spread above a horizontal of the projected beam being shown.

Figure 34 is a vertical section by a plane containing the axis of the filament through the hemi-spherical reflector showing locus of light source, slot, and the miniature reflector in front elevation.

Figure 35 is a vertical section similar to Fig. 33 showing slot formed at one side of the bottom of the hemi-spherical reflector with the slot appearing in elevation and the miniature reflector without a non-reflecting side.

Figure 36 is a vertical section through the hemi-spherical reflector in a plane containing the axis of the filament, showing the correlation of the light source, and the slot of Figure 35 and the miniature projecting reflector in front elevation.

Figure 37 is an enlarged perspective view of a modified form of miniature supplemental reflector, miniature baffle plate with connecting member and a non-reflective side.

Figure 38 is a diagrammatic illustration of the method of determining the required eccentricity of the successive elliptical generating lines for a vertically disposed joining member between successive segments of the deflector with said member facing away from the light source.

Figure 39 is a diagrammatic showing of the deflector illustrating the selective control of the width spread angle of the focal rays through the width of the deflector segments.

Figure 40 is a diagrammatic illustration of the method of determining the divergency of the sides of the central elliptical cylinder of the deflector to determinately and selectively control the extreme width spread of the beam.

In the embodiment of the invention shown in Figures 1 to 4 inclusive, a portion 1 of the device constituting a cylindrical parabolic reflecting surface is positioned below a horizontal plane passing through the axis 21 of the reflector, while the portion above the said horizontal plane as shown in Figure 2 comprises an opaque flat baffle plate 2, and a central ribbon of elliptical cylindrical deflecting surface 4, 4a, a flat inclined reflective connecting member or surface 6, a concentrated radiant light source 7 having determinate axial and diametric dimension, a hemi-spherical auxiliary reflector 8, and a surface composed of a series of segmental ellipsoidal deflector surfaces 5 (Figs. 7–16 and 39) at opposite sides of the central ribbon surface 4 and 4a. In referring to these surfaces 5 hereinafter as segments or as being segmental, is is evident that the elliptical surface or zone is intended and not the solid figure.

Omitting reference to elements 5, and other parts aforementioned are so co-relatedly positioned as shown generally in Figure 11 where the axis 21 of the cylindrical parabolic reflector 1 lies in a horizontal plane, with the line of its foci 15 in a straight line perpendicular to the central primary axis 12 of the central ribbon 4, 4a of the elliptical cylindrical deflector, and with the straight line cutting edge 14 of the baffle plate 2 locused immediately to the rear of and adjacent to the line of foci 15 of the cylindrical reflector 1, said upper surface of the baffle plate 2 being inclined upwardly away from the horizontal as shown in Figure 2, and extending forwardly to a front cover 10 as shown in Figures 5 and 6, said upper surface being in a plane containing the central primary axis 12, and the foci 13 and 16 of the deflector portion 4, 4a. This primary axis is in a vertical plane which contains the central axis 21 of the parabolic cylindrical reflector 1, the middle point of the axial line of the light source 7, and the center 18a of the hemi-spherical auxiliary reflector 8. This vertical plane divides the light source 7 and the device into two equal parts. The straight line 13a (Fig. 11) of remote foci 13 of the elliptical cylindrical reflectors 4 and 4a is locused in the rear of, adjacent to, and parallel with the cutting edge 14 of the baffle plate 2 and similarly positioned with respect to the line passing through foci 15. The foci 13 and 15 being in the same vertical plane containing axes 12 and 21. The other focus 16 of the central primary axis 12 (as illustrated in Fig. 3) is positioned on the lower periphery of light source 7. This is illustrated only by way of example, but other foci similar to 16 may be at such a predetermined distance forwardly of foci 13 and on the periphery of light source 7 or that source axially produced, as to provide the eccentricity necessary to fashion the sections 4, 4a, the size desired. In a preferred form, the cylindrical elliptical deflecting surface 4 and 4a has an axial extension from its forward vertex which substantially rests on the plane containing the upper surface of the baffle plate 2 to an oblique plane 100, (Figure 3), containing the line 13a of remote foci and the bottom edge 1a of the reflecting surface of the parabolic cylinder 1. In this form, the flat reflective connecting member 6 as shown in Figures 3 and 11 joins the line of vertices 103 (Fig. 11) of the cylindrical reflector 1, to a non-reflective connecting member 3 (Figs. 3 and 11) at the rear terminus of the central elliptical deflector surface 4, said member 3 extending upwardly in the plane 100, and to the sides 5 (not shown in Fig. 11) of the elliptical deflector.

These sides 5 are formed of a series of segmental ellipsoidal surfaces or zones as shown in Figures 7, 16 and 39, having the axis, as for example 62, 62a, etc. of Figure 16, of each segment's generating line, locused in the plane containing the upper surface of the baffle plate 2, said axes diverging from a common focus 47, Figure 16, resting on the far end of the horizontal light source 7, and extending away from the central primary axis 12 of the elliptical deflector portion 4, 4a, at such a distance that the remote foci 63, 63a, etc., will rest on a straight line 13a produced, with the successive foci 63, 63a, etc., at such a distance from the primary axis 12 that each such focus lies substantially in the middle of the width of its respective segmental section, horizontally projected on said foci line 13a (see Fig. 16) so that each remote focus 63, 63a, etc., is to the rear of, and adjacent to the cutting edge 14 of the baffle plate 2. Each segment 5 is such a portion of an ellipsoidal surface as is contained between two vertical planes parallel to a vertical plane containing the central primary axis 12 as for example, the planes containing lines 66a and 66b, Figure 16, with said segments joined to each other by a connection member 65, and joined to the central elliptical deflector portion 4, 4a by a connecting member 101, Figure 39. The longitudinal extent of the portion of each segment or zone 5 used lies between where the forward end of the segment rests on the plane containing the upper surface of the baffle plate 2 to the joining member 3 in the oblique plane 100 (Figure 3) where the rearward end rests.

The light source 7 is preferably rectilinear and of small diameter and locused horizontally and perpendicularly to the central primary axis 12 in the region of the front focus 16 of the central primary axis 12, with the lowermost point of its medial section resting on the said front focus 16 (see Fig. 3). The light source may be of the incandescent bulb type having source 7 enclosed in a spherical glass globe 19, whose center 18 is offset forwardly of and tangent to the forward edge of the light source 7 (Fig. 15).

A hemi-spherical auxiliary reflector 8 is locused on the under side of a plane containing the top surface of the baffle plate 2 and beneath the light source 7 in an aperture formed in said plate with its center 18a and the center of the globe resting on the common point 18, which point is positioned one-half the diameter of the light source 7 above the central primary axis 12 (Fig. 31).

With this brief description of the elementary parts of our light controlling and projecting media in their general correlated positions, we will now proceed to describe in detail the several parts individually and in their correlation and combination in (1) their optical properties; (2) their construction and contour; (3) their interrelation and combination including the shape, proportions, position and cooperation of parts, and (4) their functions and effect in general.

*The parabolic reflector*

It is of course well known and understood that all rays of light radiant from a source located at the focus of a paraboloidal reflector are so reflected thereby, as to be a pencil of rays parallel to the axis, or central line of the figure of the paraboloid; that all rays from a source located on the axis of the reflector to the rear of the focus are reflected away from the axis at such a diverging angle as is made by two lines drawn from the point of incidence or impingement to the origin of the rays and to the focus; and that all rays from a source located on the axis to the front of the focus are reflected convergingly to the axis through which they pass on.

And it is further well known and understood, that whatever be the nature, geometrically, of the surface, there are two primary laws: (1) that in the reflection of light the incident ray, the normal of the surface at the point of incidence, and the reflected ray, lie all in one plane; and (2) that the angle of reflection is equal to the angle of incidence measured in the plane of the normal.

In our reflector surface 1, we have used (1) the optical properties of a parabola as they function only in one line, which is the lower half of a section made by a vertical plane containing the axis of the parabola; and (2) the optical properties of a plane surface.

The concave reflector 1 has the contour of a parabolic cylinder formed by sliding along a straight line, containing the vertex and perpendicular to the vertical plane containing the axis, as a directrix, a selected portion of the lowermost element of a paraboloid as a generating line, keeping the axis in a horizontal plane perpendicular to the vertical plane containing the generating line. The surface is thus shaped so that every longitudinal section by a vertical plane containing the axis is a true lower portion of a parabolic line, having the same focal abscissa length, and every transverse horizontal section is a straight line. The reflector 1 may be made of thin metal, highly reflective on the concave side, and having an extended portion or strip 11 at the bottom, that is, beyond the line where the plane 100 containing the line of remote foci 13a intersects the reflector. Said strip is coated with a light absorbent media, as for example black paint, and extends to the front glass cover 9, said reflector being inclosed at the sides with plane, flat, vertically disposed sides 20, (Fig. 4) made of thin metal and coated on the inner surface with a light absorbent media, such as black paint, and enclosed at the front by a plain, thin glass cover 9 vertically disposed.

The under surfaces of the baffle plate 2, the hemi-spherical reflector 8 and the rear surface of the connecting member 35 (Fig. 9) all forwardly of the cutting edge 14 of the baffle plate 2 (which parts function as the top cover of the reflector 1) are also coated with a light absorbent media, such as black paint.

As the surface of our reflector has the contour of the lower half of a parabolic line in every vertical section, rays from a radiant light source locused at any focus 15 of the projecting surface and impinging on any selected points of the surface as at 58a, 60a and 83 of Figure 3 will be projected in horizontal planes parallel to the axis 21 of the reflector as shown in Figure 3 by broken lines, and rays from a light source locused on the axis to the rear of the focus and incident on the same selected points will be projected beneath the respective horizontal planes as shown by solid lines 58b, 60b, and 83a of Fig. 3; and rays from a radiant light source locused on the axis to the rear of any foci of the reflector surface as at 13, Fig. 4, and incident on any point in a transverse line of the surface parallel to the focal line containing foci 15, will be projected in a plane making such a dihedral angle with the horizontal plane at the point of impingement as the angle between the point of origin 13 and the focus 15 to the straight line 102, containing the point of impingement 61a (Figure 4), and will be projected to a roadway in a straight line parallel to the line of impingement 102; with said projected rays having such a width spread angle, or horizontal divergence as shown in Figs. 4 and 10, as is made by the paths of the rays to a vertical plane containing the axis and the point of impingement, which spread is measured in the same manner as for the side segments as shown in Figure 20, so that the reflector projects all rays in their lateral direction at the same angle unaltered as received from the deflector, and fixed by the direction and angular distance of the paths of the rays to a vertical plane parallel to the central primary axis at point of impingement. In its lateral spread influence, therefore, our reflector functions at every point only as a surface of a plane, and in its vertical spread influence, it functions at every point as the lowermost element of a paraboloid.

Were rays from any source or any direction, coming from above the plane of the axis of the parabolic reflector and in front of its principal focal line, to impinge upon the reflector surface, they would be projected in an upward direction above a horizontal plane, and would be a potential cause of glare. Just what quality of intensity is necessary to produce a blinding glare under adverse conditions, is problematical. We have found by experiment that a very small fraction of a candle power is sufficient. Regardless of intensity, quantity, quality, source or direction, our invention provides means effective positively to prevent any rays from impinging upon the reflector and being projected in an upward direction, this preventative taking the form of a light absorbent baffle plate interposed between the light source and the reflector and having a sharp non-reflective ray trimming or cutting knife edge line locused immediately to the rear, and adjacent to the line of foci of the reflector. With this baffle plate so interposed, not a single ray of any kind can incident upon the reflector as coming from in front of its foci; so that the path of all projected rays must be beneath a horizontal direction with the limit of their upward extent closely approximating the horizontal, and sharply trimmed and accurately defined by the knife edge of the baffle plate. The correlation of the reflector with the other elements of the apparatus will be discussed hereinafter.

*The baffle plate*

The optical property of the baffle plate 2 is of a negative reflective character, it being a non-reflective medium with a high coefficient of absorption. It is used for its function of destroying or eliminating adverse rays by quenching or absorption.

The plate 2 has a substantially flat plane surface; is preferably made of thin metal, coated with a light absorbent media on both sides and has its rearward end beveled rearwardly from its under face to provide a sharp cutting edge so shaped that the top line is a knife edge 14, Figure 2, highly light absorbent, with the under side so beveled that when positioned, the beveled part lies approximately on the horizontal plane 21 containing the axis of the generating line of the parabolic cylindrical reflector 1. The baffle plate 2 has an annular aperture 25 therein (Figures 5 and 6) with a removable door or cover attached in any suitable manner, through which the light globe 19 is inserted and removed. Access to this opening is had by the removal of the front glass cover 9. The baffle plate 2 also has a circular aperture 23 (Figs. 5 and 6) of such diameter as will allow the placement of the hemi-spherical auxilliary reflector 8, and is formed at opposite sides of this orifice with two semi-cylindrical depressions 88 (Figures 5, 6 and 9) as holders for the light globe sockets 26 and 29, Figure 9. The baffle plate is extended to the side of the apparatus forming a connecting member 27 (Figures 8 and 9) between the elliptical deflector segments, Figure 8, and the sides 20 of the cylindrical reflector 1; and extends forwardly to the front cover 10 as a connecting member, as shown in Figures 5 and 6.

This baffle plate 2 is so positioned relatively to the cylindrical reflector 1 that the plane containing the top surface of the baffle plate 2 makes such a dihedral angle with the horizontal plane containing the axis 21 of the cylindrical reflector 1, when pivoting at the cutting edge 14 of the baffle plate line locused immediately rearward of the line of foci 15 of the cylindrical reflector at the line of the two planes' intersection, that the angle will allow the placement of the hemispherical auxiliary reflector 8 and the placement or insertion of a holding cover 10 at the front above the axis 21, the size of the angle being governed by the extreme requirement with the factor of safety necessary to place the cylindrical reflector 1 for impingement by the highest spread of rays deflected by the elliptical deflector surfaces 4, 4a and 5, and for placement of the miniature reflector 114, Figure 33, when used.

The light source 7 is positioned (see Figs. 5, 10 and 11) in the region of the center of the aperture 23 for the hemi-spherical auxiliary projector 8 and has its length or major dimension parallel to the cutting edge 14 of the baffle plate 2 so that no direct radiant light rays can impinge the cylindrical reflector 1 unless they clear the cutting edge 14 of the baffle plate 2. These rays will in their nearest proximity to the foci 15 of the cylindrical reflector 1 extend as a sharply defined straight line parallel to the line of foci 15, and immediately rearward.

The baffle plate in its position is so correlated to the elliptical deflector surfaces 4, 4a and 5, that the sharp straight line cutting edge 14 of the baffle plate is locused immediately forward of, adjacent to, and parallel with the straight line of outlet foci 13a of the elliptical deflector 4, 4a and 5, so that all rays projected by the elliptical deflector surfaces through their remote foci 13 must impinge the cylindrical reflector 1 as if coming from a straight line source of light for the central ribbon section 4, 4a and a series of points for the segmental section locused immediately rearward of the foci 15 of the cylindrical reflector with the straight line of the light source image having that side nearest to the line of the cylindrical reflector foci 15, sharply trimmed of all adverse and stray rays, so that in their projection by the reflector, the limit of their upward extent will be a straight line parallel to the cutting edge of the baffle plate 14, with its upper edge trimmed and sharply defined for the critical line of its upper placement.

The light absorbent undersurface of the baffle plate 2, in combination with the light absorbent undersurface of the hemi-spherical reflector 8, the light absorbent rear-surface of the front connecting member 35, (Figs. 9 and 25), the light absorbent inner surfaces of the sides 20 of the reflector, and the non-reflective strip 11 at the bottom of the cylindrical reflector 1, are correlated with the vertically disposed front glass cover 9 to absorb and quench all back reflection and re-reflections from the inner surface of the front glass cover 9, and the refractions and re-refraction from the glass itself, which impinge upon the reflector surface 1 and either would be or are projected by the cylindrical reflector 1 in an upward direction.

The elliptical deflector

The elliptical deflector or reflector is divided into two primary portions, a central elliptical cylindrical ribbon surface 4 and 4a (Fig. 11) and a series of side segmental ellipsoidal surfaces or zones 5 (Figs. 7, 16 and 22) at opposite sides thereof.

It is well known that in the concave ellipsoid mirror, there are two points, viz, the foci of the generating ellipse, such that rays diverging from either will be accurately reflected to the other. This results from the property of the generating line that the normal for any point bisects the angle included between lines drawn from the foci to the point that all rays located on the axis, beyond the one focus, will be reflected to the axis beyond the other focus having the angle made by the paths of the incident and the reflected ray bisected at the normal; that any selected point of incidence has but one normal with its base resting on the axis of the generating ellipse between the foci, and that any rays impinging on the same selected point from a source of origin disposed at any point in the near region of the one focus will be projected in the region of the other focus, in the plane of the normal with the angle of reflection equal to the angle of incidence.

The central ribbon section

For the central cylindrical elliptical portion or ribbon section 4 and 4a of the deflector, we use the elliptical properties of an ellipsoid as they function only in one line, which is a portion of the upper half of a section made by a vertical plane containing the axes of the generating ellipse; and the optical properties of a plane surface.

This central ribbon portion of the concave deflector consists of two parts of cylindrical surfaces 4 and 4a, joined transversely by an upwardly disposed connecting member 22 Figure 3, said ribbon portion being formed by sliding the generating ellipses along a straight line containing the vertex, and perpendicular to the vertical plane containing the primary axis 12, as a directrix. Each of said cylindrical parts consists of a plurality of elliptical lines, joined tangentially, each ellipse for the selected section of the line employed having a common remote focus 13, with its other foci 36 and 40, Figure 13, so disposed radially, adjacent to the rearward side of the light source filament 7 that the whole of the light source 7 will be disposed axially (Figure 13) so that the paths of all rays, impinging on the sections 4 or 4a will come substantially as if on or from beyond the focus. The abscissa length of the generating illipses for these lines from the first or forward focus to the vertex is of such a length to admit the insertion of the globe 19 with clearance enough for the hemispherical auxiliary reflector 8 to function properly.

When the first section of the generating line has reached such a distance that a new focus is required to retain the rays to be projected beyond the cutting edge 14 of the baffle plate, the succeeding elliptical line with its new focus is formed with a focal abscissa line of such a length that the constructed ellipse will pass through the extremity of the first ellipse's ordinate, at a point where the first ellipse ended, which thus connects tangentially; and thus for all successive changes of foci for the generating line of the cylindrical elliptical deflector. For the vertically disposed transverse connecting member 22, a juncture is made with such an increased abscissa length that a step with its inner surface facing rearward is provided sufficiently for all surfaces of the side segmental ellipsoidal surfaces 5 joining on the transverse plane.

The lateral extent of the ribbon cylindrical elliptical deflectors 4 and 4a is determined by passing two vertical planes through the region of the ends of the light source filament 7 at such a divergence from the central primary axis 12 toward the rear as will give the desired lateral spread of the beam upon the roadway; and so that the maximum width spread projected is substantially uniform for the entire length of the ribbon elliptical cylinder, as shown, for example, and geometrically demonstrated in Figure 40.

The surface is thus so shaped that every longitudinal section by a vertical plane containing the plural axes of the generating line is a plurality of selected upper portions of true elliptical lines having at one part an extended abrupt change of eccentricity as a connecting step 22 with its face away from the light source 7; and having every transverse section a straight line. The normal of each line's tangent plane is thus positioned as in a vertical plane which contains the plural axes of their generating line.

In its correlation with the baffle plate 2, the central primary axis 12 which forms the basic structural line of the elliptical deflector 4, 4a and 5 is positioned in the upper surface of the baffle plate having its one focus 13 as the middle focus in the line of remote foci 13a of the elliptical deflector 4, 4a and 5, and having the other focus 16 positioned immediately below and tangent to the middle section of the light source filament 7 whose center is 17, Figure 3. The line of all the remote foci 13a is so positioned that the baffle plate functions as a positive preventative against rays of any kind being emitted at the edge 14 short of the foci line 13a of the elliptical cylindrical deflector, the cutting edge 14 of the baffle plate giving a sharply defined edge to all images that pass adjacent to it and which are projected by the cylindrical reflector 1 with the trimmed edge of the image uppermost and beneath a horizontal direction, said baffle plate being so locused that its ultimate edge trims off and prevents the passage of any rays which would cause up-throw if allowed to impinge the reflector surface beneath.

In its relation to the light source, the section 4, 4a has the bottom of the middle section of the filament helix 7 resting on the central primary axis 12, at focus 16 and the axis of the filament locused parallel with the lines of foci. The length of the light source helix 7 in its relation to and association with the width or lateral spread of the cylindrical surface 4, 4a determine the extreme width spread of the projected beam.

The central ribbon 4, 4a of the elliptical cylindrical deflector surface thus correlated to the light source, baffle plate and cylindrical reflector so functions that the bundle of rays emitted from the broad side of the light source 7 substantially parallel to the primary central axis are deflected in a substantially parallel bundle with their lower edge trimmed of all stray rays, and are projected by the cylindrical parabolic reflector 1, in a bundle of substantially parallel rays with its uppermost edge trimmed, to the distant part of the roadway, slightly beneath a horizontal direction, the vertical thickness of the highly concentrated beam being controlled by the diameter of the helix 7, and the angle made by the point of the deflectors 4, 4a impinged by the rays whose origin are most distant from the focus as illustrated in Figure 12.

A line of focal rays converging to impinge any point in a generated section of this central ribbon surface is projected divergently to the line of the remote foci 13a of Fig. 14 and all of the other rays from the light source impinging the same point are projected beyond the edge of the baffle plate as shown in Figure 12, the angle of thickness being controlled as explained above. By this means we use the highest sectional intensity of the light source to project a highly concentrated beam in a straight line across the roadway to illumine the distant part of the roadway with the limit of upward extent of the beam slightly beneath a horizontal direction, so as not to produce a blinding glare to other users of the highway.

When a different distribution of intensity is desired, selected portions of the generating line are modified by either moving their light source focus rearwardly the required distance to effect the placement of the projected rays as influenced by the selected sections where desired, or by extending the remote focus for the selected section rearwardly beyond the remote foci line sufficiently to produce the desired angle.

The horizontal width spread of the beam is controlled by the length of the light source 7, the width and the wedge shape of the sides of the ribbon section of the elliptical cylindrical deflector surface (Figure 40), and is determined by the elliptical cylindrical deflector before the beams impinge the cylindrical reflector 1 from which they are then projected with their angle of spread unaltered, as shown in Figure 10.

*The side ellipsoidal segments or zones of the deflector*

The other portion of the elliptical deflector is composed of a lateral series of segmental portions 5 of ellipsoidal surfaces, at opposite sides of the central ribbon section, 4 and 4a, each surface being generated by revolving a true ellipse upon its axis as shown at 62, 62a, etc., in Figure 16 as a center of revolution, with said surfaces cut obliquely to their axes, these segments being made by vertical planes cutting the ellipsoidal surfaces parallel to the central primary axis 12, and using a portion of the upper half.

The foci of the generating ellipses have a common point 47, Figure 16, locused at the far side of the light source 7 for one side series of segments 5, and a common point 47a for the other side series (see Fig. 17), and have their outer or other foci 63 to 63e locused in a line common to the line of the remote foci 13a of the central elliptical cylindrical ribbon portion and at such a distance from the central primary axis 12 where said line 13a is cut by a vertical plane passing through the middle of the width of the segment used; thus the remote foci 63—63e of each segment are locused at such a distance from the central primary axis 12 that all the projected rays of the ellipsoidal deflector surfaces 5 will impinge the cylindrical reflector 1 in a downward direction, so as to be projected substantially parallel to the center line of the roadway; the amount of divergence from the parallel being controlled by the width of the segmental sections 5 and the locus of the foci 63—63e in combination with the axial length of the light source 7.

The focal abscissa lines (from focus to vertex) of the generating ellipses of these side elliptical segments are of such a length that starting from the central ribbon cylindrical portion 4 at the transverse section jointure 22, Figure 3, in the region of the foci 16, each successive segmental section 5 will have such a changed eccentricity as to form therebetween and along their entire length, vertically extended joining members 65, see Figs. 16, 17 and 39, whose inner surface will face away from the source of light, and whose depth is such as to facilitate manufacturing, such, for example, as by die pressing operations in metal as shown by Figure 25. Likewise, a similar connecting member 101 (see Figs. 17 and 39) is provided between the central ribbon section 4 and the sections 5 immediately flanking it on either side.

Each segment 5 is generated by revolving its own generating ellipse 64—64e of Figure 16 on its own axis 62—62e as an axis of revolution, and has its own focal abscissa length to provide for the changed eccentricity required to form the connecting members 65 and 101, which new length of abscissa is determined by precalculation geometrically depicted in Figure 38 as will be evident to one skilled in the art of geometrical optics. The side ellipsoidal segments 5, similarly to the central ribbon section 4 and 4a may be formed with thin metal highly reflective on its concaved under surface.

In our preferred form the side ellipsoidal segmental surfaces 5 are divided by a transverse vertical connecting member 22 in the region of the proximate foci 16 into a forward part extending to the plane of the upper surface of the baffle plate 2, and a rearward part extending to a plane 100, Fig. 3, containing the remote foci line 13a of the deflector and the bottom edge of the reflective surface 1a of the cylindrical parabolic reflector 1. The contour of the forward part is generated by the same method in every respect as in the rearward part.

As to its position and correlation with the central ribbon 4 and 4a of the cylindrical elliptical surface, the segment portions 5 form the sides of the deflector; each side having its one common focus 47 of Figure 16 locused in the line perpendicular to the primary axis through focus 16 resting on the end of the light source 7 farthest from the side generated and the other foci 63—63a, etc. resting on the extended line of the remote foci 13a of the central portion. Only such portion of the first segment adjacent to the ribbon section 4, 4a is used as is not needed for the ribbon cylindrical surface and is attached to the central ribbon section by a vertically extending joining member 101 as explained above.

In respect to the baffle plate 2, the Segmental deflector is positioned thereabove having the axes 62—62e of each generating line 64 to 64e lying in the upper surface of the baffle plate with the vertices of the front end resting upon it. The deflector 4, 4a and 5 is joined at its edges to the baffle plate 2 by a connecting surface 27a (Figures 9 and 25) which may be integral therewith and which in line with the diameter of the hemispherical reflector 8 is formed with alining semi-cylindrical depressions 87 which overlie, enclose and hold the upper portion of the sockets in which the ends of the light source globe are mounted.

The series of remote foci 63 to 63e of Figure 16 are numerically the same as the number of segments and extend in a straight line to the rear of, adjacent to, and parallel with the cutting line 14 of the baffle plate, so that no rays projected can pass between the two foci of a segment nor be emitted to the reflector below, so that the focal end of all images of the light source projected from any point in a segment are passed over the cutting edge of the baffle plate which trims the lower edge accurately and sharply defines the upward limit of extent of the image projected to the roadway.

The deflector is optically correlated with the light source by positioning the latter with its straight line filament between the two common foci 47 and 47a, Figure 16, of the generating ellipses with the ends of the light source resting on the foci, and with the bottom of the light source filament resting on and tangent to a line between the two foci locused in the upper surface of the baffle plate and perpendicular to the central primary axis 12 through its focal point, thus so positioning the lateral dimension of the light source that it is parallel to the series of remote foci 13a. Substantially all rays emanating from the region of the light source will, therefore, be deflected on or beyond the cutting edge of the baffle plate, having the focal end of the image as the undermost of the deflected and thereafter the uppermost of the pencil of projected rays, with the pencil's limit of upward extent in the same critical line of placement as that of the cylindrical ribbon portion of the deflector, and the rest of the image in a downward direction, so that rays divergent from a single radiant light source locused at the front focus are by the segments segregated into groups (illustrated in Figures 17, 18 and 39), each group converging to its own single point of exit from which they diverge in a downward direction as a lateral narrow wedge shaped bundle, spread vertically in a fan for substantially their whole length and parallel to a parabolic element of the cylindrical reflector, as shown in Figure 19.

The angle of width spread of any focal ray impinging on any selected point of the segments surface, as for example at 44 of Figure 21, is measured by the angle the path of the ray makes with a vertical plane through the remote focus of the segment 5 parallel to the central primary axis 12. As illustrated in Figure 20, 47 is the source of origin of a ray at focus, 44 is a selected point of incidence at the extreme side of segment; line 44—63b is the path of the deflected ray; a—b—c—d is the vertical plane through the remote focus, the angle 44—63b—P being swept down to the horizontal plane and coinciding with n—63b—O, which angle on the horizontal is the measurement of the lateral spread of the projected ray on the roadway, the angle X—63b—O is the horizontal projection, but not the measurement of width spread. The control of width spread is effected by the width of the segments as shown in Figure 39 to meet any predetermined requirement of lateral placement.

In their functional relation to the parabolic cylindrical reflector 1, the side ellipsoidal segments 5 collect divergent rays and beams of light emanating from a radiant light source 7, and its region, and converge them so that the focal rays of the beam concentrate substantially on a series of selected points 63 to 63e, Figure 16, predetermined, with the rest of the beam extending from those points beyond the trimming edge 14 of a light quenching baffle plate 2. The segments 5 are so positioned relatively to the parabolic cylindrical reflector that the path of all impinging rays pass to the rear of the foci 15 of the cylindrical reflector, with their direction for their width spread fixed before they impinge the reflector.

In accordance with our invention, we control their width spread by the shortening or the lengthening of the light source 7, the width of the segments 5, and the locus of their remote foci as will be evident from a comparison of the points 63b—63r, inclusive, in Figure 39.

A changed placement of intensity is effected by the shifting rearwardly one of the foci of the generating line of a segment, or part of a segment, so as to deflect the rays more to the rear of the cutting edge of the baffle plate, according to the angle required for the placement of the projected rays upon the highway.

The connector

The connector surface 6, Figures 2, 3 and 11, utilizes, optically, only the property of a plane surface. It has the contour of a flat oblong plane highly reflective on the inner side. As shown at 6, Figure 11, the flat highly reflective surface as used in our preferred form, is inclined between the parabolic reflector 1 and the elliptical deflectors 4 and 5, so as to make a dihedral angle in the illustrated embodiment, of substantially 56 degrees with and above the upper surface of the baffle plate 2. Its lower edge at 103, Figures 3 and 11, joins the upper edge of the parabolic reflector along the vertices 103 in a rectilinear line and its upper edge is joined to a connecting member 3, facing away from the source of light 7, and lying in the plane 100 (Figure 3) containing the line of remote foci 13a and the bottom of the reflective edge of the reflector 1, in which plane the upper edge of the flat reflective surface 6 is joined to the surface of the connecting member 3 in a straight line. The connector surface 6 forms the structural connecting member between the elliptical deflectors 4 and 5 and the cylindrical reflector 1, and is so correlated to the light source 7 that all rays radiant rearwardly above the baffle plate 2, from the region of the light source 7, which do not impinge the elliptical deflectors 4 and 5 so as to be deflected to impinge the surface of the cylindrical reflector, impinge upon the connector and are deflected thereby to the reflective surface of the parabolic cylindrical reflector, or to the light absorbent media of the reflector's sides.

This connector surface 6 is so optically related to the front glass cover 9 (Fig. 2) that it prevents any rays from being projected through the front glass cover except those projected by the parabolic cylindrical reflector itself, so that all back reflections going in an upward direction which might cause glare are destroyed by absorption and so that all rays coming from, or as if from, the light source 7 and incident upon the flat connecting surface 6 are so deflected as not to impinge directly upon the inner surface of the front glass cover.

The light source

For the light source 7 we use a spherical clear glass globe 19 enclosing a rectilinear, small diameter helix of radiant light filament of any selected size, said globe having two axial extensions or ferrules 28 (Fig. 26) at opposite ends of a diameter of a globe, (which diameter, however, in another and our preferred form, is offset but parallel to and spaced from the axis 17'—17' of the helix a distance equal substantially to ½ the diameter of the helix). The ends of the ferrules 28 are conically shaped with their apices in the line of the axis 17'—17' as shown in Figure 26, and with the axes of the cones resting on a common line, which line also when the globe is placed in operative position coincides with the axis of the holding socket members 26 and 29, which are formed with similar conical sockets to receive the ferrules 28. The middle section of the helix 7 is positioned in a vertical plane that contains a diameter of the globe which diameter is perpendicular to the said axis in the ferrules. The electric current is passed through the filament helix in one direction, the axial extensions or ferrules 28 constituting conductors electrically connected with the opposite ends of the helix, and the electrical connections may be made in any of the conventional ways.

The axis 17'—17' of the filament 7 is positioned with respect to the elliptical deflectors 4, 4a and 5 on a line made by the intersection of two planes, the one being a plane perpendicular to the top surface of the baffle plate 2 and passing through the focus 16 of the central primary axis and perpendicular to the central primary axis 12, and the other plane being parallel to the top surface of the baffle plate 2, and ½ the diameter of the light source 7 above it; with the middle section of the helix 7 in a vertical plane containing the central primary axis.

In our preferred arrangement, the center of the globe 18 (Fig. 31) is locused forward of and tangent to the middle section of the helix 7 in the plane parallel to the upper surface of the baffle plate 2, and ½ the light source diameter above it. Rearwardly in said plane where the cones of the ferrules 28 are intersected a side is removed from the cones so that a face 92 (Fig. 28) is provided which is perpendicular to the plane of the upper surface of the baffle plate in the focal position of the light globe, and the cone shaped receiving sockets of the members 26 and 29 are positioned to coincide, the wall of each socket being provided with a protuberance or accretion 93 (Fig. 29) corresponding to the portion or side removed from the cones of the ferrule and positioned in the same plane, these protuberances functioning as keys interfitting with the faces 92 of the cones of the ferrules 28.

The receiving socket members 26 and 29 are positioned in said parallel plane, ½ the diameter of the helix above the baffle plate and equal distances from the central primary axis 12 of the elliptical deflectors 4, 4a and 5, one socket 26 being fixed and insulated from the faces of the enclosing and holding depressions 87, 88 by a sleeve 125 and the other socket 29 being movable along its axis within an insulating sleeve 26a fixed in the holding depression 87, 88. A compressible helical spring 30 is seated within the sleeve 26a at its closed outer end and acts against the outer end of the socket member 29 so that a constant pressure maintains the globe 19 and the light source 7, in its true focal position.

This spring allows sufficient outward movement of the socket member to give sufficient clearance at the other socket 26 to insert or remove the globe 19 with such a limit of the compression distance of the spring 30, and such a clearance between ends of the insulating sleeves 125 and 26a that the flat pyramidal surfaces 92 of the ferrule cone must contact the flat surface of the protuberances 93 of the movable socket member 29 before sufficient clearance is obtained at the stationary socket 26 for the other end of the ferrule to enter. The light source 7 is, by said means, made self-focusing and is protected against a wrong placement.

To maintain the face 93 of the movable socket 29 in the same plane at all times this socket is guided by and restricted to movement in this plane by means of a stem 90 (Fig. 26) rectangular in cross section encircled by the spring 30 and guided at its outer end through a similarly squared opening in the closed outer end of the fixed sleeve 26a.

With the light source so sized, shaped and positioned, it is optically correlated with the other parts of the device to function as described above.

*The hemi-spherical auxiliary reflector*

This last element, the hemi-spherical auxiliary reflector 8, is used for increasing the intensity of the light projected by the apparatus, and employs the optical properties of the spherical mirror whose light source is placed at the center thus being a surface of accurate reflection, the radius to any point of impingement being its normal.

The auxiliary reflector 8 having the contour of a hollow hemisphere, is made, preferably, of thin metal highly reflective on the concaved side, and having a light absorbent medium on its convexed side, and having two semi-circular recesses 94 (Fig. 32) cut out at opposite sides of the rim on the same diameter 107 with a line 106 parallel to said diameter 107 and spaced ½ the diameter of the filament helix distant on the plane of the great circle rim, as a center of revolution for recesses 94, to permit the placement of the socket member holding depressions 88. It is sized sufficiently large to permit the placement of the globe 19 with sufficient clearance between the globe and the hemi-sphere for the proper functioning of the auxiliary reflector.

For the purpose of positioning the hemispherical auxiliary reflector 8 in its correlation with other parts of the device, the center 18a of the true hemi-spherical reflector 8 is locused to rest on the center 18 of the globe, and the great circle of the sphere comprising the rim of the reflector 8 is locused to be contained in a plane parallel to and ½ the filament 7 diameter above the upper surface of the baffle plate 2 with the diameter 107 used for locating as the axis 106 of revolution for the recesses, perpendicular to the central primary axis.

In the operative structure, the part of the auxiliary reflector above the upper surface of the baffle plate 2 is removed; thus in its relative position with the light source 7 it is substantially beneath it with its center 18a offset forwardly from the axis of the helix.

It is generally well known and understood that there is a substantial amount of light reflected from the inner surface of the lamp bulb 19, both from direct rays from the light source as well as from rays projected through it by the auxiliary reflector, producing inner surface gyrations of the rays; and since the center of the globe 18 and the center of the auxiliary reflector 8 have a common point, disposed in reference to the central primary axis axially forward of the light source 7 and tangent to it, the rays reflected by the inner surface of the globe 19 and the auxiliary reflector 8 will form a virtual image on the side of the center 18 opposite from the light source, and will impinge upon the elliptical deflectors 4, 4a and 5, as if coming from a light source of twice the diameter or thickness, so that the auxiliary reflector collects the divergent rays emitted substantially in a downward direction from the radiant light source and converts them into rays converging substantially in an upward direction, concentrating them substantially through the region of the light source from which they diverge in an upward direction as if coming from the light source of an enlarged diameter.

Thus we utilize the rays emitted from the off side of the light source from the elliptical deflector to intensify the near side so as to substantially double the intensity of the light going in the direction of the deflector surfaces, and so as to illuminate the intermediate and near part of the roadway.

The described apparatus may be enclosed in a metal cover or casing of suitable form having a holding standard by means of which it may be supported in properly adjusted position.

The described light projection apparatus as will be seen from Figure 25, may be economically manufactured from sheet metal by dieing and stamping operations upon sheet metal blanks such as shown in said Figure 25. The particular form of the blank and nature of the dieing stamping and jointure is not involved herein. We have merely shown such a shaped stamping identifying the parts thereof corresponding to the apparatus as hereinbefore described as indicative of the practicability of the apparatus for manufacture.

The primary or basic idea of our invention which has been described in detail in the foregoing may take varied forms, all expressing the operative principles of the invention. Some of these variations will now be described.

When it is desired to intensify the illumination of any selected area, or areas of the roadway, we may change the contour of the cylindrical parabolic reflector 1 from a true parabolic line into a plurality of true parabolic lines, joined tangentially, having a common axis, each successive part of the generating line having its own focal abscissa length with its focus at such a distance from the vertex as when positioned in its correlation with the cutting edge of the baffle plate 2 and the foci 13a of the ellipitical deflectors 4, 4a and 5, it will make such a focal position angle for that section of the generating line as to be substantially of the same angle of downthrow which is required for the projected ray to impinge the selected area, having the other parts of the apparatus as first described.

It is well known and understood that the optical properties of a hyperboloidal mirror are that of a light locused at the interior focus will be reflected along the axis or central line of the figure at such an angle of divergence from it that is made by a line drawn from the exterior focus through the point of incidence. In this form of our invention we use only the lowermost element of the lower half of a hyperbola. When a predetermined variable distribution of the intensity of the projected light is desired to be placed upon the roadway, we accomplish this result by changing the contour of the cylindrical surface 1 from a true half parabolic line into a hyperbolic line 1b of Fig. 24, and the interior focus 15 of the hyperbolic generating line 1b, to coincide with the focus of the parabolic. The exterior focus is on the horizontal axis 21, say at 108, Fig. 24, at a distance to give the angle of downthrow to the composite beam as is predetermined. With this modification in the generating line of the cylindrical reflector, the construction and the other parts are the same as in the first form described.

In still another form when yet a different variety of placement of intensity is desired, we accomplish the result by constructing the generating line for the contour of the cylindrical reflector surface so as to be a plurality of hyperbolic lines, joined tangentially, thus forming a compound hyperbolic line 120a to 122b, Figure 23. In this case instead of having one outside rear focus it is made up of a series of foci 120, 121 and 122, located on the horizontal axis 21. With the generating line thus fashioned the contour of the cylindrical surface is formed and positioned the same in every respect as in our first embodiment.

In still another variation of our invention to meet a still more exacting distribution of intensity we construct the generating line of the cylindrical reflector in part a true parabolic line and in part a hyperbolic, or in part a compound hyperbolic line, having a common interior focus 15 and joined tangentially, according to the angle or angles of downthrow required for the several sections of the reflector.

Another form in which the invention may be embodied, when it is desired to give great permanency and efficiency to the mirrored surface of the cylindrical reflector, is provided by using a different material for the construction of the reflector. We then make our reflector fashioned as above described out of thin clear glass, silvered on the convexed side, and the convexed side having the contour of the true parabolic, or any of the modified contours as described above, and having the back or convexed side supported or strengthened in any conventional way. In this combination the sides 20 of the reflector as described in our first form, the absorbent bottom strip 11, and the front glass cover 9 are omitted.

Should it be desirable to project a part of the rays above a horizontal direction, we select such one or more segments of the elliptical deflector 5 which has the required sectional intensity of light and cut a recess 32, Fig. 6, into the outlet edge 14 of the baffle plate 2 of such a depth as will allow the focal ray of the beam of that segment or segments to impinge the parabolic cylindrical reflector 1 as if coming from in front of its foci 15 in such an upward angle as to project the focal side of the beam the height desired; and so construct the selected segments with their remote foci as at 63, etc., of Figure 16, adjacent to the outlet edge of the recess 32.

Another modified form, when it is desired to project a narrow cone of light above a horizontal in any predetermined direction without producing glare to users of approaching motor vehicles so as to illuminate objects above the horizontal we cut an orifice 33 (Fig. 6) into the baffle plate 2 at one spot forward of the cutting edge of the baffle plate 2 and locus in correlation to it the remote foci as at 63d of Fig. 16 of the segment to coincide with the chosen exit orifice in the baffle plate, thus causing all the orifice emitted rays to impinge the reflector beneath, as coming from in front of its foci.

When it is desired to have a diffused color scheme to the face of the reflector so that viewed from above a horizontal direction the surface of the reflector will appear, as for example, blue, an orifice 34 of Fig. 6 is cut in the baffle plate forward of the cutting edge 14 and a translucent media as blue colored glass is placed over the orifice, with the intensity of the rays passing through the orifice so reduced and diffused as not to produce glare.

When it is desired to project a bundle of rays above a horizontal direction, at any divergence of upthrow from the horizontal so as not to produce glare in the form of a band extending horizontally across the roadway, and of substantially uniform sectional intensity, with the upper and lower edges of the band sharply defined in the limit of their vertical extent, and directed to the right side of the roadway with the limit of the left side of the beam on the center of the roadway, or at any angle from the center, either with a narrow or a wide width spread as is predeterminedly desired, we cut a slot or orifice 113, Figs. 33 and 34, parallel to the light source 7 in the bottom of the hemi-spherical reflector 8. A miniature parabolic cylindrical reflector 114 generated and made the same way as the large parabolic cylinder reflector 1 is positioned immediately beneath the slot orifice with the axis of the miniature reflector parallel to the axis 21 of the main parabolic reflector, or at any vertical dihedral angle thereto, and with its line of foci 116 rearwardly of the rear edge of the orifice 113 and parallel to it, and the distance between the rear edge of the slot 113 and the foci line 116 is made of such an extent as will give the angle of upthrow that is desired for the lowermost rays to diverge above the horizontal.

Should it be desired to have the beam to the right of the center of the roadway, the orifice in the hemi-spherical auxiliary reflector 8 is cut at the bottom of the reflector parallel to the light source and having the extreme left side end of the slot line in a vertical plane parallel to the central primary axis 12 containing the right side of the filament, as shown at 113a in Figs. 35 and 36, and the miniature reflector will have its left side covered with a light absorbent media at 118, Fig. 37. The line of vertices of the miniature reflector 114 is connected with an absorbent media and extending forwardly beyond the line of the foci 116 (Fig. 35) the distance as predeterminedly required for the angle of upthrow, and the upper surface of the outlet edge of the miniature baffle 115 is connected to the auxiliary hemi-spherical reflector 8 at the rearward edge of the orifice 113a Figs. 35 and 36 by a vertically disposed plate or connecting member 117a Fig. 36 and Fig. 37, made of thin metal coated with a light absorbent media on both sides. The thickness or depth of the beam is controlled by the width of the orifice and the diameter of the light source, so that a concentrated beam of light is projected whose limit of extent on its lower, upper and left side is accurately defined in its projection to illuminate the roadway above a horizontal direction, and to the right of the center of the highway, and at such an angle of elevation for the lowermost rays of the beam that there is no glare produced to other users of the highway.

When the first form described is supplemented by this feature the dihedral angle between the horizontal plane containing the axes of the cylindrical reflector 1, and the plane containing the upper surface of the baffle plate 2 is enlarged to such an amount as is required to admit the placement of the miniature reflector above the horizontal plane as shown in Fig. 33.

In another modified embodiment of our invention, when greater simplicity of structure is desired to facilitate manufacture and for the placement of the parts when a mirrored glass cylindrical reflector is employed, we change the contours of the central cylindrical deflector 4 and 4a, and of the segmental ellipsoidal deflector 5 so as to dispense with the transverse joining member 22, Fig. 3, and also dispense with the highly reflective connecting member 6, Fig. 3, between the elliptical deflector 4 and 5 and the parabolic reflector 1. This is accomplished by changing the contour of the generating line of the central elliptical part 4 and 4a to be a plurality of sections of true ellipses, joined tangentially, from the light source vertices to substantially the horizontal plane containing the axes of the parabolic reflector 1, and in all other respects as described in our first form, and for the series of segmental ellipsoidal zones 5 by changing the contour of each generating line to be one true ellipse, using and having the position of the surfaces when constructed to extend with their front ends resting on a plane containing the upper surface of the baffle plate 2, and their rear ends substantially resting on the horizontal plane 21 containing the axes of the parabolic cylindrical reflector, as shown in Figs. 7 and 15; and being joined to the cylindrical reflector by a flat non-reflective connecting member 89, Figs. 7 and 15, in the plane of the horizontal sufficiently inclined away from the light source 7 that no direct rays from it impinge the flat surface 89. In this combination the front glass cover 9, must be slightly inclined away from the vertical outwardly at the top, so that the back reflection from the inner surface of the glass will be projected from the reflector either into the light absorbent bottom surface of the baffle plate 2 or to re-enter the elliptical deflector. The front glass cover may be omitted and back reflection avoided when the parabolic cylindrical reflector is made of glass as previously described.

When a greater concentration of the vertical spread is desired for the rays deflected from the central elliptical portion, we accomplish this by changing the relative positions of the light source 7 with the globe 19 and the auxiliary reflector 8 by removing the offset and positioning the diameter 18 of the globe 19, and the diameter 18a of the auxiliary reflector 8 on a common line with axis 17'—17' of the helix 7, and the axes of the ferrules and the sockets; by locusing the center of the globe 18 and the center 18a of the auxiliary reflector 8 on a common point with the center 17 of the middle section of the helix 7 as shown in Fig. 30, and by making the recesses 94 in the rim of the auxiliary reflector to have their center of revolution to coincide with the diameter of the auxiliary reflector so that the axes of all are on a common line, and the centers of the helix middle section, of the globe, and of the auxiliary reflector are on a common point in that line. And in this construction the coils of the helix are stretched so as to allow the passage of the reflected rays from the hemi-spherical reflector through the area of the light source between its spaced coils.

While the light source illustrated, is preferably in the form of a helix, we do not wish to be limited thereto. Other types of ray emitting elements may be employed, as for example, a filament in grid form having predetermined dimensions and positioned in predetermined relation within the spherical globe.

These various modifications and variations of structure are based on the same fundamentals of structure and operative principles as in the basic form first described, and illustrate the flexibility and extreme accuracy of control, light placement and distribution made possible by the elements of optical control as correlatedly combined by our invention. The preceding detailed descriptions of its operative principles and media make it unnecessary to recapitulate its operation. While fundamentally and primarily the invention is intended for use as a headlight for road vehicles because of its ability to provide safe maximum road illumination without glare and with a wide range of preselected light control and placement, it is recognized that the invention is applicable to light projection and control, generally.

We claim:

1. Light projecting apparatus comprising a cylindrical parabolic reflector positioned beneath a horizontal plane containing its axis, a light quenching baffle plate positioned above and inclined to the said horizontal plane and having a straight line rear edge positioned parallel with and adjacent to the straight line of foci of the parabolic cylindrical reflector, an elliptical cylindrical reflector surface, a rectilinear light source of small diameter positioned in focal relation to the line of foci at one end of the elliptical cylindrical reflector surface so as to deflect all impinging direct radiant rays to and beyond a line of remote foci at the other end of said elliptical cylindrical surface, said latter surface being divided into a plurality of transverse portions, the respective portions being formed by sliding along a straight line as a directrix, elliptical sections, joined tangentially, each section of the generating line having two foci, the one focus being locused at the outlet edge of the baffle plate in common to all the sections of the generating line, and the other focus being locused in the region of the light source and being disposed along the axes of the elliptical reflector at such points that the angle between the light source and focus, for the point of impingement in the section will project the rays to the rear of the foci of the parabolic reflector at such an angle of down-throw as will distribute a selected portion of the quantity of the direct radiant light of the light source to intensify the illumination of the near and intermediate part of the roadway as may be desired.

2. In combination with a transversely elongated light source, a reflector portion comprising a group of zones of ellipsoidal surfaces having a common proximate focus in the far end of said light source, said zones forming portions of different ellipsoids and placed side by side above the light source, and the remote and individual foci of said zones lying in a single substantially horizontal line drawn parallel to said light source.

3. In combination with a transversely elongated light source, a reflector portion comprising a group of zones of different ellipsoidal surfaces having a common proximate focus in the far side of said light source, a similar reflector portion whose ellipsoidal surfaces have a common proximate focus in the other side of said light source, the remote focus of each zone of said different ellipsoidal surfaces lying in a common line drawn parallel to said light source, and the axes of revolution of the ellipsoidal surfaces of one reflector portion intersecting the axes of revolution of the ellipsoidal surfaces of the other reflector portion.

4. In combination with a transversely elongated light source, a reflector comprising: a central reflecting ribbon comprising an elliptical cylindrical surface having its proximate focal line on the periphery of said light source and its remote focal line parallel to the light source, a side reflector portion comprising a group of zones of ellipsoidal surfaces having a common proximate focus in the far half of said light source, a similar side reflector portion whose ellipsoidal surfaces have a common proximate focus in the other half of said light source, the remote foci of said side reflector portions lying in the said remote focal line produced and the axes of revolution of the ellipsoidal surfaces of one side group intersecting the axes of revolution of the ellipsoidal surfaces of the other side group of reflecting surfaces.

5. In combination with a transversely elongated light source, a reflector comprising: a reflecting ribbon comprising an elliptical cylindrical surface having its proximate focal line on the periphery of said light source, a side reflector portion comprising a group of zones of ellipsoidal surfaces having a common proximate focus in the far half of said light source, the remote foci of said side ellipsoidal surfaces and the remote focal line of said elliptical cylindrical surface lying in a common line and the axes of revolution of the ellipsoidal surfaces of the said group intersecting the axis of the directrix of said reflecting elliptical cylindrical surface.

6. In combination with a transversely elongated light source, a reflector comprising: a reflecting ribbon comprising an elliptical cylindrical surface having its proximate focal line on the periphery of said light source, a side reflector portion comprising a group of zones of ellipsoidal surfaces having a common proximate focus at the far end of said light source, the remote foci of said side ellipsoidal surfaces and the remote focal line of said elliptical cylindrical surface lying in a common line and the axes of revolution of the ellipsoidal surfaces of the said group intersecting the axis of the directrix of said reflecting elliptical cylindrical surface.

7. In combination with a transversely elongated light source, a reflector comprising: a central reflecting ribbon comprising elliptical cylindrical segments disposed in tandem having their individual proximate focal lines on different portions of the periphery of said light source and their remote focal lines coincide in a line parallel to the light source, a side reflector portion comprising a group of ellipsoidal segments having a common proximate focus at the far end of said light source, the remote foci of all of said side ellipsoidal segments lying in a line common to the remote focal lines of said cylindrical segments.

8. A light projector comprising a reflecting surface formed of a group of zones of different ellipsoidal surfaces, the boundary edges of said zones being formed by parallel planes, said surfaces having a common proximate focus and having their remote foci on a common line, a light source parallel to said common line, said proximate focus being on the far end of said light source, said parallel planes being drawn obliquely to the axes of said zones and at right angles to said common line.

9. In combination with a transversely elongated light source, a reflector portion comprising a group of segments of ellipsoidal surfaces having a common proximate focus on the far end of said light source and each segment having its remote focus lying in a line drawn parallel to said light source, said remote foci lying beyond the opposite end of said source, and another similar reflector portion comprising a group of segments of ellipsoidal surfaces having a common proximate focus in the other end of said light source and each segment having its remote focus lying in said aforementioned line, said last mentioned remote foci also lying beyond the first named end of the light source.

10. Means for creating a composite beam of predetermined dimensions laterally and vertically comprising a reflector portion formed of a group of segments of ellipsoidal surfaces, the boundary edges of said segments determined by parallel planes, said segments having a common proximate focus and their remote foci on a line, a light source parallel to said line of remote foci, said proximate focus being on said light source, said parallel planes being drawn obliquely to the axes of said segments and at right angles to said line, and a trough like focalizing reflector associated with the aforementioned surfaces with its focal line slightly forward of and parallel to said remote focal line.

11. A light projector comprising a transversely elongated light source, a reflector portion above said light source and comprising a group of segments of ellipsoidal surfaces having a common proximate focus in the far end of said light source and the remote focus of each segment lying in a common line drawn parallel to said light source, a parabolic cylindrical reflector below said light source and having its focal line near and parallel to said line of remote foci, and light shield means extending rearwardly from the forward lower edges of said segments to said line of remote foci, said shield means being located between said light source and cylindrical reflector thereby preventing rays of said light source from reaching said cylindrical reflector in advance of its focal line, a portion of said shield means being disposed in a plane containing said remote foci, and having an edge substantially coincident with said line of remote foci.

12. In combination with a transversely elongated light source, a reflector portion comprising a group of segments of ellipsoidal surfaces having a common proximate focus in said light source and the individual remote focus of each segment lying in a common line drawn parallel to said light source, light shield means extending rearwardly from the forward lower edges of said segments to said line of remote foci, a portion of said shield means being disposed in a plane containing said line and having an edge substantially coincident therewith, and a trough-like focalizing reflector facing said ellipsoidal surfaces with its focal line slightly forward of and parallel to said line of remote foci.

13. In combination with a transversely elongated light source, a reflector portion comprising two groups of zones of ellipsoidal surfaces, each group having a common proximate focus in the far end of said light source and each zone having its individual remote focus lie in a line drawn parallel to said light source, a light shield having an edge parallel to and adjacent said line of remote foci, said shield extending toward said light source and united with the forward lower edges of said group of zones, and a parabolic cylindrical reflector facing said ellipsoidal surfaces and shield with its principal focal line adjacent said line of remote foci.

14. In combination with a transversely elongated light source, a reflector portion above said source comprising a group of zones of ellipsoidal surfaces having a common proximate focus in the far end of said light source and each zone having its individual remote focus lie in a line drawn parallel to said light source, a hemispherical reflector underlying said light source for reflecting downward rays back to said zones, a light shield having an edge parallel to and adjacent said line of remote foci, said shield extending toward said light source, about said hemispherical reflector and united with the forward lower edges of said group of zones and a trough-like focalizing reflector facing said ellipsoidal surfaces and shield with its focal line slightly forward of said line of remote foci.

15. In combination with a baffle plate having a rearward straight line trimming edge, a rectilinear light source of relatively small diameter forward of and parallel with said trimming edge, a segmental reflector on one side of a plane containing said baffle plate, said reflector comprising a laterally extending series of substantially parallel segments of ellipsoidal surfaces having a common proximate focus in the far end of the light source, the remote focus of each segment being spaced in a line parallel with and adjacent to said trimming edge, said baffle plate and said reflector being joined forward of said light source and a parabolic cylindrical reflector locused beneath a horizontal plane containing its axis having its focal line parallel with and adjacent to said trimming edge and slightly forward of and parallel to the line of remote foci of the superimposed segmental reflector.

16. Light projecting apparatus comprising a transversely elongated light source, a hemispherical reflector underlying said light source, an upper reflector comprising a wedge shaped central reflecting ribbon and side reflecting portions, said ribbon comprising a plurality of transverse sections of elliptical cylindrical surfaces joined in tandem, every section of said ribbon having its proximate focal line on the periphery of the light source, and its remote focal line resting on a horizontal straight common line parallel with said light source, each side reflecting portion comprising a series of substantially parallel zones of ellipsoids whose axes diverge to said common line produced from a common proximate focus, having the said common focus of each side reflecting portion locused within the other side on the far end of the light source, and the individual remote foci locused on said common line produced within their respective side, a baffle plate extending rearwardly from the forward lower edge of said reflecting ribbon and said zones to the said common straight line produced having an orifice encircling said hemispherical reflector and having a rear horizontal straight line trimming edge parallel with and forwardly adjacent to said common straight line, and a trough like focalizing reflector below said baffle plate facing said reflecting ribbon and said zones with its focal line parallel with and forwardly adjacent to said baffle plate edge.

17. Light projecting apparatus comprising a rectilinear light source, a parabolic cylindrical reflector positioned beneath a horizontal plane containing its focal line and the axis of its parabolic directrix, having the said light source positioned above said plane parallel with and forward of said focal line, a baffle plate interposed between said reflector and light source, said baffle plate having a straight line trimming edge positioned parallel with and adjacent to said focal line, so that every point of the parabolic cylindrical surface has the same restriction to the use of its optical properties, and reflector means to compel substantially all the rays to be concentrated to the parabolic cylindrical reflector and to reach said reflector over and beyond said trimming edge, so that substantially every ray of light will reach the parabolic cylindrical reflector by crossing through or in rear of its focal line, but not in front thereof.

18. Light projecting apparatus comprising an elongated light source, a cylindrical reflector whose directrix is an arc of an open conic section, said cylindrical reflector positioned on one side of a plane containing the axis of the arc and the focal line of the cylindrical reflector, the light source being positioned on the other side of said plane parallel with and forward of said focal line of the reflector, a baffle plate interposed between said cylindrical reflector and the light source, said baffle plate having a rear straight line trimming edge positioned parallel with and adjacent to said focal line, so that every point of the cylindrical reflector surface has a restriction to the use of its optical properties, and reflector means to compel substantially all the rays to be concentrated to said cylindrical reflector, and to reach said reflector over and beyond the said trimming edge, so that substantially every ray of light will reach said cylindrical reflector by crossing through or in rear of its focal line, but not in front thereof.

19. In combination with a baffle plate having a rear horizontal straight line trimming edge, an elongated light source near the forward end of the plate and parallel with said trimming edge, and a reflecting dome resting with its forward lower edges on said baffle plate, each side of said reflecting dome comprising a series of parallel zones of ellipsoids having their axes diverge in the plane of the baffle plate from a common proximate focus and having the said common proximate focus of each side locused within the other side on the far end of the light source, and their individual remote foci locused on a common straight line parallel with and rearwardly adjacent to said horizontal line trimming edge of the baffle plate within their respective side, so that the reflected images of the light source from every point of the reflecting dome surface have said images' end which originated at the proximate focus trimmed horizontally in their passage over and beyond the baffle plate edge.

20. In combination with a baffle plate having a rear straight line trimming edge, an elongated light source near the forward end of the plate and parallel with said trimming edge, and a reflecting ribbon resting with its forward end upon said baffle plate, said ribbon comprising a plurality of transverse sections of elliptical cylindrical surfaces joined in tamden, every section of said ribbon having its proximate focal line on the periphery of the light source and its remote focal line coincident with a horizontal straight common line parallel with said light source and parallel with and rearwardly adjacent to said horizontal line trimming edge, so that the reflected images of the light source from every point of the reflecting ribbon surface have the said images' side which originated at the line of the proximate foci trimmed horizontally in their passage over and beyond the baffle plate edge.

21. A light projector comprising a focalizing cylindrical reflector positioned beneath a horizontal plane containing its focal line, a plane light shield positioned above said reflector and having its rear straight line light trimming edge terminating parallel with and closely adjacent to said focal line of the reflector, a light source positioned above said reflector and its focal line and above said light shield, and reflector means extending from the vicinity of the light source to substantially the plane of the upper edge of the cylindrical reflector to compel the rays from the light source to converge toward the cylindrical reflector and to cause said rays of light to reach the said focalizing cylindrical reflector by crossing through or in the rear of its focal line, but not in front thereof.

22. In combination with a baffle plate having an elongated line light trimming edge, a light source on one side of said plate and forward of its trimming edge and reflector means extending from rearwardly of said trimming edge to the front of said light source and substantially surrounding said light source, said reflector means having its proximate focus substantially coincide with said light source and its remote foci substantially coincide with said line trimming edge, whereby the rays from the light source are compelled to converge to the said trimming edge of the baffle plate and to pass on the one side thereof.

Witness our hands this 23rd day of April 1929, county of New York, State of New York.

HAROLD E. SMITH.
HARRY E. BUFFINGTON.